United States Patent
Matsutani et al.

(10) Patent No.: US 10,497,942 B2
(45) Date of Patent: Dec. 3, 2019

(54) METHOD FOR MANUFACTURING CATALYST HAVING SUPPORTED CATALYST PARTICLES OF CORE/SHELL STRUCTURE

(71) Applicant: TANAKA KIKINZOKU KOGYO K.K., Chiyoda-ku, Tokyo (JP)

(72) Inventors: Koichi Matsutani, Hiratsuka (JP); Takeshi Kaieda, Hiratsuka (JP); Tomohiro Akiyama, Hiratsuka (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 0 days.

(21) Appl. No.: 15/548,193

(22) PCT Filed: Mar. 2, 2016

(86) PCT No.: PCT/JP2016/056353
§ 371 (c)(1),
(2) Date: Aug. 2, 2017

(87) PCT Pub. No.: WO2016/143618
PCT Pub. Date: Sep. 15, 2016

(65) Prior Publication Data
US 2018/0034062 A1 Feb. 1, 2018

(30) Foreign Application Priority Data
Mar. 9, 2015 (JP) .................. 2015-046360

(51) Int. Cl.
*H01M 4/88* (2006.01)
*C25D 21/04* (2006.01)
(Continued)

(52) U.S. Cl.
CPC .......... *H01M 4/8878* (2013.01); *C25D 21/04* (2013.01); *H01M 4/8657* (2013.01);
(Continued)

(58) Field of Classification Search
CPC ............ B01J 23/44; B01J 37/02; H01M 4/86; H01M 4/8657; H01M 4/88; H01M 4/8853;
(Continued)

(56) References Cited

U.S. PATENT DOCUMENTS

| 2013/0302641 A1* | 11/2013 | Zhang | B32B 15/01 428/654 |
| 2015/0299886 A1* | 10/2015 | Doubina | C25D 5/34 205/157 |
| 2016/0359173 A1* | 12/2016 | Kaneko | C25D 7/00 |

FOREIGN PATENT DOCUMENTS

| JP | 2008-525638 A | 7/2008 |
| JP | 2014-508038 A | 4/2014 |

(Continued)

OTHER PUBLICATIONS

International Search Report for PCT/JP2016/056353, dated Apr. 26, 2016.
(Continued)

*Primary Examiner* — Louis J Rufo
(74) *Attorney, Agent, or Firm* — Orrick, Herrington & Sutcliffe LLP; Joseph A. Calvaruso; K. Patrick Herman

(57) ABSTRACT

A method for forming catalyst particles, each of which has a core/shell structure, by a Cu-UPD method. Namely, a method of manufacturing a catalyst wherein catalyst particles, each of which has a core/shell structure composed of a shell layer that is formed of platinum and a core particle that is covered with the shell layer and is formed of a metal other than platinum, are supported on a carrier. This method is characterized by comprising: an electrolysis step wherein the carrier supporting the core particles is electrolyzed in an electrolytic solution containing copper ions, so that copper is precipitated on the surfaces of the core particles; and a substitution reaction step wherein a platinum compound solution is brought into contact with the core particles, on
(Continued)

which copper has been precipitated, so that the copper on the surface of each core particle is substituted by platinum, thereby forming a shell layer that is formed of platinum. This method is further characterized in that the platinum compound solution in the substitution reaction step contains citric acid.

11 Claims, 2 Drawing Sheets

(51) Int. Cl.
  *H01M 4/86* (2006.01)
  *H01M 4/92* (2006.01)
  *H01M 8/1018* (2016.01)
(52) U.S. Cl.
  CPC ......... *H01M 4/8853* (2013.01); *H01M 4/926* (2013.01); *H01M 2008/1095* (2013.01)
(58) Field of Classification Search
  CPC ........ H01M 4/8878; H01M 4/90; H01M 4/92; H01M 4/926; H01M 8/10; H01M 208/1095
  See application file for complete search history.

(56) References Cited

FOREIGN PATENT DOCUMENTS

| | | |
|---|---|---|
| JP | 2014-213212 A | 11/2014 |
| JP | 2014-229516 A | 12/2014 |
| JP | 2015-150511 A | 8/2015 |
| JP | 2015-205233 A | 11/2015 |
| JP | 2015-225064 A | 12/2015 |
| WO | WO 2011/099956 A1 | 8/2011 |
| WO | WO 2012/115624 A1 | 8/2012 |

OTHER PUBLICATIONS

European Extended Search Report for EP Appl. No. 16761588.9, dated Dec. 3, 2018.
Shao, et al., "Core-shell catalysts consisting of nanoporous cores for oxygen reduction reaction," Physical Chemistry Chemical Physics, vol. 15, No. 36, Jan. 1, 2013, p. 15078.

* cited by examiner

METHOD FOR MANUFACTURING CATALYST HAVING SUPPORTED CATALYST PARTICLES OF CORE/SHELL STRUCTURE

BACKGROUND OF THE INVENTION

Field of the Invention

The present invention relates to a method of manufacturing a catalyst containing carrier-supported catalytic particles having a core/shell structure comprising a shell layer including platinum and core particles containing a metal other than platinum. In particular, the present invention relates to a method of manufacturing a catalyst which is useful for a catalyst for solid polymer fuel cells, exhibits excellent manufacturing efficiency and also has a satisfactory catalytic activity.

Description of the Related Art

Fuel cells have been highly promising as a next-generation power generation system. In particular, solid polymer fuel cells, employing a solid polymer as an electrolyte, have been desired for use as a power source for electric automobiles because of a lower operational temperature comparing with that of phosphoric acid fuel cells and the like and compactness thereof. A mixture of a catalyst and solid polymer is used as an electrode to promote an electrochemical reaction in solid polymer fuel cells.

A catalyst in which a platinum particle is supported as a catalytic component on an electrically conductive material such as carbon powder is generally known as a catalyst for fuel cells. With respect to such catalysts, while catalytic activity is attributable to existence of platinum, platinum is particularly expensive among precious metals, and thus the amount thereof used is to significantly affect the catalyst cost and thereby the fuel cell cost. Therefore, there has been a need for the development of a catalyst in which the amount of platinum used is reduced.

With respect to methods to reduce the amount of platinum used in the catalysts for fuel cells, such catalysts of which constitution of the supported catalytic particle is adjusted have been proposed. Specifically, catalysts in which a core/shell structure composed of a core particle containing a metal other than platinum and a platinum shell layer covering the core particle surface is applied to the constitution of the catalytic particle have been proposed. For example, a catalyst in which palladium or a palladium alloy is employed as a core particle and a platinum layer of monoatomic or semi-monoatomic level covers the core particle is described in Patent Literature 1.

CITATION LIST

Patent Literatures

[Patent Literature 1]
National Publication of International Patent Application No. 2008-525638
[Patent Literature 2]
International Publication No. WO 2011/099956
Then, Cu Under Potential Deposition (hereinafter, referred to as the Cu-UPD technique) has been utilized as a method of manufacturing a catalyst having such a core/shell structure. In a method of manufacturing a core/shell type catalyst in accordance with the Cu-UPD technique, a surface of each core particle including palladium or a palladium alloy is covered with a monoatomic layer of copper with a predetermined electrochemical treatment and then the copper layer is displaced by platinum to form a platinum layer. For example, a core particle supported on a suitable carrier is subjected to an electrolytic treatment in an electrolytic solution such as a copper sulfate solution under predetermined conditions to form a copper layer on the core particle surface, then the treated material is brought into contact with a platinum compound solution, thereby the copper is displaced by the platinum to form a platinum shell layer. The reason for forming the temporary copper layer on the core particle in this manner is that there may happen formation of a thicker platinum layer exceeding monoatomic or semi-monoatomic layer or deposition of platinum in the solution that does not cover the core particle when a platinum layer would be deposit on the core particle surface directly.

SUMMARY OF THE INVENTION

Technical Problem

Although the Cu-UPD technique can advantageously form a platinum shell having a suitable thickness of a monoatomic or semi-monoatomic layer, strict control of the potential is required during formation of the copper layer on the core particle. This is because the platinum layer is formed through a simple displacement reaction between platinum, which is a more precious metal in terms of potential, and copper, a base metal, in the conventional Cu-UPD technique as described above, and thus the copper layer which is to be displaced by platinum is required to be homogeneous at an extremely high level. Therefore, the electrolytic treatment has been required to be performed equally to all the core particles in the conventional method.

In Patent Literature 2 described above, for example, ink composed of carbon powder containing a core particle supported thereon and a suitable dispersion medium is prepared, the ink is applied homogeneously to a disk electrode and dried, then the electrode is immersed in an electrolytic solution, followed by electrolysis (see FIG. 2). During this electrolysis, the core particle acts as a working electrode to deposit copper on the core particle surface. Subsequently, copper and platinum are displaced by each other to form a platinum shell layer on the core particle surface upon contact of a platinum compound solution with the disc electrode. In order to surely and equally apply a potential to each individual core particle, thereby forming a homogeneous unilaminar copper layer, a small amount of the core particles are applied to the disc electrode and it is subjected to an electrolytic treatment.

An object of manufacturing a catalyst according to the conventional Cu-UPD technique is aimed at obtaining a catalyst having a satisfactory activity while decreasing the amount of platinum used, and the object has been sufficiently achieved. The amount of the catalyst manufactured per manufacture is, however, small and results in inefficient manufacturing in a method comprising applying a small amount of the core particles to the disc electrode and performing an electrolytic step in the manner described above. This method is a laboratory manufacturing method and is not suitable for industrial manufacturing.

The present invention has been made under the above circumstances. And with respect to a method of manufacturing a catalyst in which a catalytic particle having a core/shell structure is formed according to the Cu-UPD technique, the present invention provides one in which manufacturing efficiency is improved so as to be capable of mass production and a catalyst having also a satisfactory catalytic activity can be manufactured.

Solution to Problem

As described above, low manufacturing efficiency in the conventional Cu-UPD technique is attributable to the electrolytic treatment step to form the copper layer on the core particle. In the conventional methods, a small amount of the core particles are homogeneously applied and closely fitted to the electrode, thereby homogeneity of the potential control is ensured. This is because contact between the core particles and electrode becomes so heterogeneous that dispersion of the potential control happens among the core particles, and thereby the copper layer thickness can not be made uniform, when a large amount of core particles are brought into contact with an electrode and are electrolytically treated.

The present inventors have investigated to optimize the platinum displacement step following the copper layer formation as an approach to solution of the problem described above. This is intended that the catalyst particle having the core/shell structure, being a final goal, can be manufactured, even if a somehow heterogeneous copper layer is formed by relaxation of strictness in the potential control in the electrolytic treatment step, so far as the following displacement by platinum is performed effectively. Then, it has been considered that relaxation of strictness in the potential control in the electrolytic treatment step can lead to enhancement of the throughput, and thereby can enhance the overall manufacturing efficiency. Accordingly, the present inventors have further investigated to find that addition of citric acid to the reaction system can lead to formation of an effective platinum layer in the displacement reaction step for the formation of the platinum layer.

The present invention to solve the problem described above is a method of manufacturing a catalyst including a catalytic particle supported on a carrier, the catalytic particle having a core/shell structure including: a shell layer containing platinum; and a core particle covered with the shell layer and containing a metal other than platinum. The method is characterized by steps of: subjecting the carrier supporting the core particle to electrolysis in a copper ion-containing electrolytic solution, thereby depositing copper on a core particle surface, as an electrolytic treating step; and bringing a platinum compound solution into contact with the copper-deposited core particle to displace the copper on the core particle surface by platinum, thereby forming the shell layer comprising platinum, as a displacement reaction step, and the platinum compound solution in the displacement reaction step contains citric acid.

As described above, the present invention is characterized by improving on the step for platinum displacement following the copper layer formation on the core particle, with regard to the Cu-UPD technique. This improvement is to perform the treatment in a state where citric acid is added to the platinum compound solution, thereby exhibiting an effect of enhancing a coverage with platinum on the core particle surface. Copper is to be directly displaced by platinum in the conventional platinum displacement step without citric acid addition. With respect to the reason for the enhanced coverage with platinum and resulting optimization by the citric acid addition as observed in the present invention, it is deemed that the displacement reaction follows a reaction mechanism where the citric acid mediates the displacement reaction between the copper and platinum, i.e., the copper and citric acid are displaced by each other and subsequently the citric acid and platinum are displaced by each other, or alternatively that platinum ion in the platinum compound solution forms a platinum-citric acid complex to change reduction potential thereof.

The present invention will be explained in more detail below. In the method of manufacturing a catalyst according to the present invention, the basic steps conform to the Cu-UPD technique. The step of manufacturing a catalyst by the Cu-UPD technique includes: providing a core particle supported on a carrier; covering the core particle surface with a copper layer as an electrolytic treatment step; and displacing the copper on the core particle surface by platinum, thereby forming a platinum shell layer as a displacement reaction step.

The core particle comprises a metal other than platinum. As such a metal, palladium, iridium, rhodium, ruthenium, gold or an alloy thereof can be applied, and preferably palladium or a palladium alloy is applied. Palladium is suitable for the core particle because it has excellent chemical stability and also can improve an activity of the catalyst. Further, as a palladium alloy, a palladium-nickel alloy, palladium-copper alloy, palladium-cobalt alloy, or palladium gold alloy can be applied. These palladium alloys can improve the activity of the catalyst more. In addition, a concentration of the additional element, e.g., nickel or copper, is preferably 1/1 or more and 1/12 or less as a molar ratio of additional element:palladium when a palladium alloy is applied. Further, an average particle diameter of the core particles is preferably 2 nm or more and 50 nm or less.

The core particles are treated in a state where the core particles are supported on a carrier in the present invention. As a carrier, electrically conductive materials usually used for carriers of catalysts including, for example, electrically conductive carbon powder, electrically conductive ceramic powder can be applied. A method for forming the core particle on the carrier is not particularly limited and a known technique may be utilized. By way of example, a carrier is immersed in a solution of a metallic compound of a metal containing the core particle and the resultant material is reduced to be able to form the fine core particles. Additionally, when an alloy is employed for the core particle, the alloy can be formed in the following procedure; the metal particle manufactured in the manner described above is immersed in a solution of a compound of a metal to be the additional element of the alloy, then the resultant material is reduced, followed by a heat treatment, or alternatively the carrier is immersed in a solution of compounds of two or more metals comprising the core particle, then the resultant material is reduced, followed by a heat treatment.

To the core particle provided as described above, the copper layer is electrolytically deposited on the particle surface in the electrolytic treatment step. The electrolytic treatment is a treatment where the core particles are arranged to the working electrode side and steady potential is applied thereto, thereby copper is deposited from the electrolytic solution. Now it should be noted that strict and homogeneous potential control to each individual core particle as in the conventional method is not required in the present invention as the platinum layer formation in the subsequent displacement reaction step is optimized. In the present invention, it is not necessary to apply and closely fit a small amount of the core particles to the electrode as is in the conventional method, thereby the throughput can be enhanced.

Aspects for this enhanced throughput may include a state where the core particles (carrier supporting the core particles) are laminated to the electrode (working electrode). Even when the core particles are not fitted closely as are in the applied and dried state in the conventional method, the core particles can be electrolyzed via the carrier. Even though the potential of each individual core particle exhibits somewhat heterogeneity in that state, the catalytic particle having the core/shell structure can be finally formed in the present invention. The electrolytic deposition is performed in an electrolysis vessel housing an electrolytic solution. In the present invention, for example, bottom part of the electrolysis vessel is composed of an electrically conductive material, which is made to be the working electrode, and core particles are laminated thereto, thereby a large amount of the core particles can be treated. In such a case, even when the carrier supporting the core particles is laminated to the working electrode in 1-800 mg/cm$^2$, the treatment can be effectively performed in the present invention. In addition, an electrolysis vessel capacity also can be increased in the present invention and catalyst manufacturing is possible in an electrolysis vessel of 1-50 L, in which industrial manufacturing is supposed to be performed.

The electrolytic solution in the electrolytic treatment is a copper compound solution and is not particularly limited so far as it is generally considered to be useful for Cu-UPD. Preferred specific examples of used copper compounds include copper sulfate, copper nitrate, copper chloride, copper chlorite, copper perchlorate, copper oxalate, and the like.

Potential control conditions for the electrolytic deposition are adjusted depending on the kinds of metal of the core particle. When palladium or a palladium alloy is used for the core particle and copper for the covering, for example, it is preferred that the potential is fixed at 0.35-0.40 V (vs. RHE) and the potential fixing time is 1 hour or more and 10 hour or less in the electrolysis conditions.

Additionally, it is preferred to make the dissolved oxygen content in the electrolytic solution 1 ppm or less in this electrolytic treatment step. This is because high dissolved oxygen content may result in oxidation and dissolution of the deposited copper and it can be a hindrance to the subsequent displacement reaction with platinum. In addition, with regard to the dissolved oxygen content in the electrolytic solution, usual bubbling of inert gas (e.g., nitrogen) can hardly make it 1 ppm or less. Bubbling of inert gas is performed for 4-48 hours within a closed space where the oxygen concentration has been reduced (preferably 0 ppm) as a preferred pretreatment for decreasing the dissolved oxygen content. The dissolved oxygen content in the electrolytic solution can be made 1 ppm or less in this manner.

The core particle having the copper layer formed is formed through the electrolytic treatment step described above, then the platinum compound solution is brought into contact with the core particle to cause displacement between the copper and platinum, thereby the platinum shell layer is formed. This displacement treatment can be conducted continuously in succession to the electrolytic deposition step by means of addition of the platinum compound solution into the electrolysis vessel. Alternatively, the core particles may be taken out from the electrolysis vessel and immersed in the platinum compound solution.

The platinum compound solution is not particularly limited, and preferred is a solution of chloroplatinic acid, potassium chloroplatinate, tetraammineplatinum chloride, or diamminedinitritoplatinum nitric acid, and particularly preferred is a solution of potassium chloroplatinate. The amount of the platinum compound in the solution is preferably from an equivalent quantity to quadruple quantity on the basis of the necessary number of moles of platinum compound calculated from Cu-UPD. In addition, again with regard to this platinum compound solution, it is preferred to make the dissolved oxygen content 1 ppm or less.

Addition of citric acid to the platinum compound solution is required in order to optimize the displacement reaction between the copper and platinum in the present invention. With respect to the addition of citric acid, citric acid may be added to the platinum compound solution in advance, and then the platinum solution may be brought into contact with the core particle, or alternatively, citric acid may be brought into contact with the core particle, and subsequently the platinum compound may be added. The amount (number of moles) of citric acid added is preferably tenfold or more and 40-fold or less on the basis of the number of moles of the platinum compound. This is because a coverage with the platinum shell is decreased when the amount of citric acid is small. An amount of citric acid exceeding 40-fold is not preferred as the citric acid covers the platinum shell, thereby decreasing the catalytic activity.

With respect to a treating period of time in the platinum displacement reaction, it is preferable to ensure 30 minutes or more. In addition, With respect to a treating temperature, particular control is not required and the treatment can be performed at a normal temperature.

The catalyst having the core/shell structure comprising the platinum shell layer is formed through the platinum displacement step described above. Furthermore, the catalyst can be the one in which the catalytic particle having the core/shell structure is supported on the carrier when the step is performed in the state where the core particle is supported on the carrier. In addition, it is preferable to suitably perform washing and drying after formation of the platinum shell layer.

Advantageous Effects of the Invention

As explained above, the present invention is to optimize the platinum displacement treatment step with respect to a method of manufacturing a catalyst according to the Cu-UPD technique including an electrolytic treatment step and platinum displacement treatment step, thereby relaxing the strict treating conditions in the electrolytic treatment step to achieve an enhanced throughput. According to the present invention, a catalytic particle having a core/shell structure can be efficiently manufactured. Additionally, the catalyst manufactured according to the present invention also exhibits a satisfactory activity, and thus, is excellent in balance between a cost reduction effect due to reduction in the amount of platinum used and improved catalytic performance.

DETAILED DESCRIPTION OF THE PREFERRED EMBODIMENTS

The best mode of the embodiment in the present invention will be explained below.

First Embodiment

In this embodiment, a catalyst containing supported catalytic particle having a core/shell structure where palladium is employed as the core particle was manufactured, and then activity thereof was evaluated. At first, 35 g of carbon powder (trade name: Ketjen Black EC, specific surface area: 800 g/m$^3$), which was to be the carrier of the catalyst, was immersed in a palladium chloride solution (amount of Pd, 15 g (0.028 mol)), then the solution was neutralized with sodium carbonate. The resultant material was subjected to a reduction treatment with sodium formate to produce carbon powder supporting a palladium particle which was to be the core particle.

Figure 1:
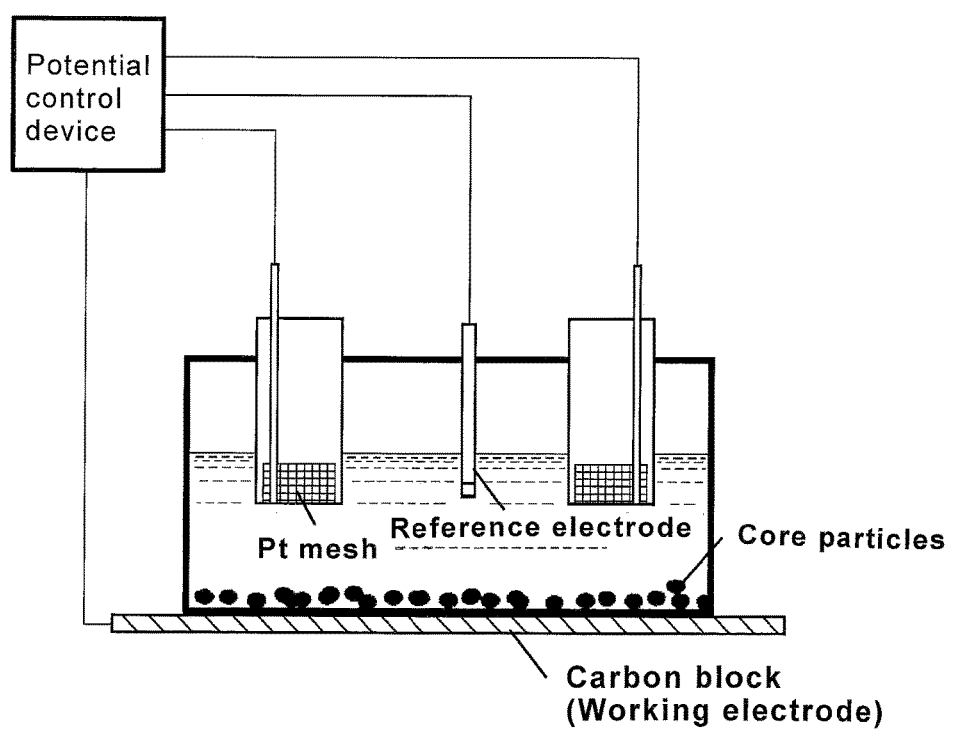
FIG. 1 is an illustrative drawing of the constitution of the electrolysis apparatus used in the present embodiment.
Figure 2:
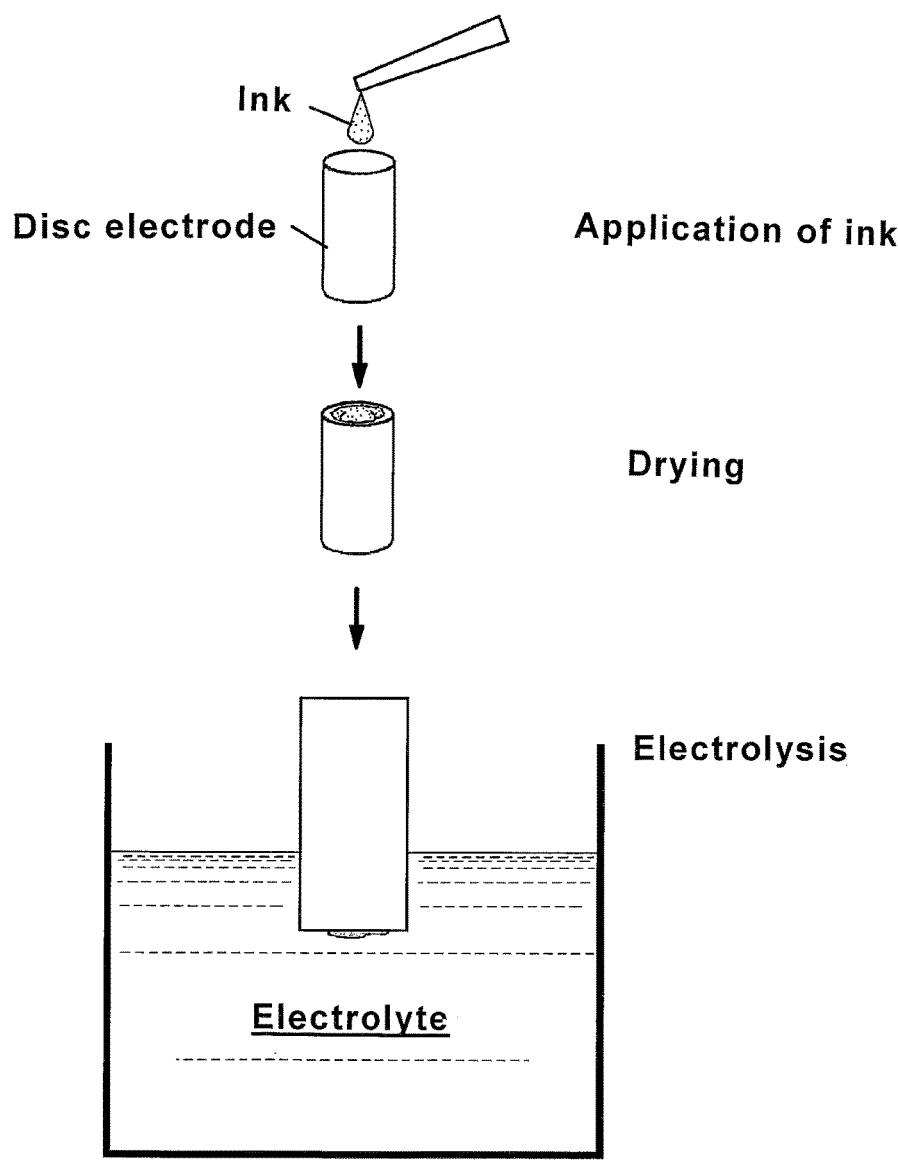
FIG. 2 is an illustrative drawing of the conventional method of manufacturing a catalytic particle having a core/shell structure.

Subsequently, the palladium particle surface was covered with a copper layer. The electrolysis apparatus used in the present embodiment is shown in FIG. 1. The electrolysis apparatus shown in FIG. 1 is equipped with a counter electrode tube having platinum mesh as a counter electrode and reference electrode inserted in an electrolysis vessel housing an electrolytic solution. The bottom part of the electrolysis vessel is composed of carbon blocks which act as a working electrode. The counter electrode, reference electrode and working electrode are connected to a potential control device.

In the electrolytic treatment of the palladium particles, 6 L of a sulfuric acid solution (0.05 M) was introduced into the electrolysis vessel at first, then 50 g (0.32 mol) of copper sulfate was dissolved therein, followed by pretreatment for reducing a dissolved oxygen content. In this pretreatment, nitrogen was blown into a glove box so as to make the oxygen concentration therein about 0 ppm at first, then nitrogen blowing into the glove box and nitrogen bubbling into the electrolytic solution were performed for 12 hours, while the electrolysis apparatus was placed therein. Then, it was confirmed that the dissolved oxygen content in the electrolytic solution was 1 ppm or less prior to the electrolytic treatment. Ten grams of the carbon powder supporting the palladium particles in the manner described above were immersed to the bottom part of the electrolysis vessel, then copper is electrolytically deposited while the potential was controlled with the potential control device. The electrolysis conditions in this electrolytic treatment are described below. In addition, the nitrogen blowing into the glove box and nitrogen bubbling into the electrolytic solution were continued also during the electrolytic treatment.

Electrolysis Conditions
  Potential: fixed potential at 0.39 V (vs. RHE)
  Potential fixing time: 3 hours After the electrolytic treatment step, 3.4 g (0.0083 mol) of potassium chloroplatinate was dissolved in the electrolysis vessel as a platinum compound solution. Also, 48 g of citric acid was added simultaneously. Herewith, the displacement reaction between the copper on the palladium core particle surface and platinum. The reaction period of time in this displacement reaction step was set to 1 hour. After forming the platinum shell layer, the carbon powder was filtered and recovered, then washed with pure water followed by drying at 60° C. to give the catalyst.

The amount of the catalyst obtained in the manufacturing step described above is 10 g. This amount manufactured shows that 100000-fold or more amount of the catalyst can be manufactured in one step on the basis of that in the conventional Cu-UPD technique (μg order).

Comparative Examples 1, 2

Commercially available catalysts containing a platinum particle and platinum alloy particle, respectively, were provided for the comparison with the catalyst containing the supported catalytic particle having the core/shell structure. The provided catalysts are a platinum catalyst (trade name: TEC10E50E) and platinum-cobalt catalyst (trade name: TEC36E52).

Then, the activities (Mass Activities) were determined for the catalysts of First Embodiment and Comparative Examples 1 and 2, respectively. The evaluation method employed is to investigate an oxygen reduction activity while rotating a rotary disk electrode with 8 μg of a catalyst applied thereto in an electrolytic solution. Flowing oxygen reduction currents were determined for a range of 0.1 V-1.0 V at a sweeping rate of 5 mV/s, while this electrode was rotated at each steady rate (1000 rpm, 1250 rpm, 1500 rpm, 1750 rpm, 2000 rpm, 2250 rpm, 2500 rpm) in an electrolytic solution saturated with oxygen. After the measurement, the mass activities of platinum were calculated in a manner where the current value at 0.9 V for each rotational rate was approximated by the Koutecky-Levich equation, followed by calculation of the mass activity from the kinetically controlled current. These results are shown in Table 1.

TABLE 1

|  | Mass Activity (at 0.90 V A/g$_{Pt}$) |
| --- | --- |
| First Embodiment | 598 |
| Comparative Example 1 | 185 |
| Comparative Example 2 | 315 |

Table 1 illustrates that the catalyst manufactured in the present embodiment exhibits an extremely higher oxygen reduction activity in comparison with the platinum catalyst and platinum-cobalt catalyst of Comparative Examples. The manufacturing method of the present embodiment can be confirmed to be satisfactory also from a characteristic view point of the manufactured catalyst.

Second Embodiment

In this embodiment, catalysts were manufactured while the amount of citric acid added in the displacement reaction step following the electrolytic treatment step was varied. Palladium-nickel alloy was employed as the core particle. The same carbon powder as used in the First Embodiment which was to be a carrier was immersed in a solution of palladium nitrate (amount of Pd, 53 g (0.50 mol)) and nickel nitrate (amount of Ni, 176 g (3.0 mol)), then the solution was neutralized with sodium hydroxide. Then, a particle comprising a palladium-nickel alloy was formed on the carbon powder by means of a heat treatment. Subsequently, this carrier was immersed in 0.5 M sulfuric acid (80° C.) to remove the nickel. Such formation of the palladium-nickel alloy particle and removal of the nickel are performed in order to form pores on the alloy particle surface due to elution of the nickel, thereby enhancing the surface area and activity thereof.

Then, copper was electrolytically deposited on the core particle surface in the apparatus and under the conditions same as those employed in the First Embodiment. Furthermore, potassium chloroplatinate and citric acid were added to the electrolytic solution after the electrolysis, followed by formation of the platinum shell in the same way as First Embodiment. In this embodiment, plural catalysts were manufactured while the amount of citric acid added was varied. Additionally, a catalyst treated without addition of citric acid was also manufactured. Then, activities of the catalysts were evaluated in the same way as First Embodiment. These results are shown in Table 2.

TABLE 2

| Amount of citric acid added | | Mass Activity |
| --- | --- | --- |
| Amount added | Molar ratio to Pt | (at 0.90 V A/$g_{Pt}$) |
| 0 g | zero-fold | 287 |
| 16 g | tenfold | 384 |
| 32 g | 20-fold | 370 |
| 48 g | 30-fold | 684 |
| 64 g | 40-fold | 635 |

It can be confirmed that the existence of citric acid addition results in difference of the catalytic activity from Table 2. The amount of citric acid added is preferably a tenfold to 40-fold amount.

INDUSTRIAL APPLICABILITY

The present invention is to optimize the platinum displacement treatment step in a method of manufacturing a catalyst according to the Cu-UPD technique, thereby achieving an enhanced amount of the catalyst produced. According to the present invention, a catalyst having a core/shell structure which exhibits a satisfactory activity can be efficiently manufactured, and also a cost reduction effect due to reduction in the amount of platinum used can be expected.

What is claimed is:

1. A method of manufacturing a catalyst comprising a catalytic particle supported on a carrier, the carrier comprising electrically-conductive carbon powder or electrically-conductive ceramic powder, the catalytic particle having a core/shell structure comprising: a shell layer; and a core particle covered with the shell layer and comprising a metal other than platinum, the method comprising the steps of:
   subjecting said catalytic-particle-supported carrier to electrolysis in a copper-ion-containing electrolytic solution, thereby depositing copper on a surface of the core particle, as an electrolytic treating process; and
   bringing a platinum compound solution into contact with the copper-deposited core particle to substitute the copper on the surface of the core particle with platinum, thereby forming a shell layer comprising platinum, as a substitution reaction process;
   wherein the platinum compound solution in the substitution reaction process contains citric acid,
      prior to the electrolytic treating process, an electrolytic apparatus is placed within a closed space where an oxygen concentration has been reduced before introduction of the electrolytic apparatus, and bubbling of inert gas is performed into the electrolytic solution for 4 hours or more and 48 hours or less, and
   an amount of dissolved oxygen in the electrolytic solution in the electrolytic treating process is controlled to 1 ppm or lower.

2. The method of manufacturing a catalyst according to claim 1, wherein a content of the citric acid in the platinum compound solution is 40-fold or less on the basis of the number of moles of the platinum compound.

3. The method of manufacturing a catalyst according to claim 1, wherein the electrolytic treating process is an electrolytic treatment, which is conducted by accumulating the core-particle-supported carrier on a working electrode.

4. The method of manufacturing a catalyst according to any of claims 1, 2 and 3, wherein a metal which constitutes the core particle is palladium, iridium, rhodium, gold, or an alloy of these metals.

5. The method of manufacturing a catalyst according to claim 2, wherein the electrolytic treating process is an electrolytic treatment, which is conducted by accumulating the core-particle-supported carrier on a working electrode.

6. The method of manufacturing a catalyst according to claim 2, wherein a metal which constitutes the core particle is palladium, iridium, rhodium, gold, or an alloy of these metals.

7. The method of manufacturing a catalyst according to claim 3, wherein a metal which constitutes the core particle is palladium, iridium, rhodium, gold, or an alloy of these metals.

8. The method of manufacturing a catalyst according to claim 1, wherein a dissolved oxygen content in the platinum compound solution in the substitution reaction step is 1 ppm or less.

9. The method of manufacturing a catalyst according to claim 1, wherein an amount of the platinum compound in the platinum compound solution in the substitution reaction step is from an equivalent quantity to quadruple quantity on a basis of a necessary number of moles of platinum compound calculated from Cu-UPD.

10. The method of manufacturing a catalyst according to claim 2, wherein a dissolved oxygen content in the platinum compound solution in the substitution reaction step is 1 ppm or less.

11. The method of manufacturing a catalyst according to claim 2, wherein an amount of the platinum compound in the platinum compound solution in the substitution reaction step is from an equivalent quantity to quadruple quantity on a basis of a necessary number of moles of platinum compound calculated from Cu-UPD.

* * * * *